United States Patent
Kamani

[19]

[11] Patent Number: 5,950,767
[45] Date of Patent: Sep. 14, 1999

[54] OPTICAL DOOR LOCK

[75] Inventor: Sanjay Kamani, Unionville, Conn.

[73] Assignee: Otis Elevator Company, Farmington, Conn.

[21] Appl. No.: 08/911,871

[22] Filed: Aug. 15, 1997

[51] Int. Cl.[6] .................................................. B66B 13/06
[52] U.S. Cl. ........................................ 187/335; 187/280
[58] Field of Search .................................. 187/280, 316, 187/291, 289, 313, 335, 331, 391, 393; 49/116, 120

[56] References Cited

U.S. PATENT DOCUMENTS

| | | | |
|---|---|---|---|
| 5,454,447 | 10/1995 | Kulak et al. | 187/331 |
| 5,487,448 | 1/1996 | Schollkopf et al. | 187/393 |
| 5,616,895 | 4/1997 | Spiess | 187/391 |

FOREIGN PATENT DOCUMENTS

| | | |
|---|---|---|
| 0035979A1 | 9/1981 | European Pat. Off. . |
| 0130493A2 | 1/1985 | European Pat. Off. . |
| 2212548 | 7/1989 | United Kingdom . |
| WO8001186A1 | 6/1980 | WIPO . |

OTHER PUBLICATIONS

U.K. Search Report dated Sep. 12, 1997; Serial No. GB 9713687.3.

U.S. Patent application Serial No. 08/672,680 filed Jun. 28, 1996 entitled "Car Door Lock"; Marc F. Chevilliard, et al. (OT–2707).

U.S. Patent application Serial No. 08/893,430 filed Jul. 11, 1997 entitled "Car Door Locking System"; Ali Bozorgzadeh, et al.

Primary Examiner—Kenneth W. Noland

[57] ABSTRACT

A safety chain of an elevator system utilizes optical fiber to verify mechanical locking of elevator doors. The elevator doors have locks which incorporate the optical fiber to determine if each of the doors has been locked. The optical safety chain provides the necessary feedback to the elevator controller for safe operation of the elevator system.

2 Claims, 2 Drawing Sheets

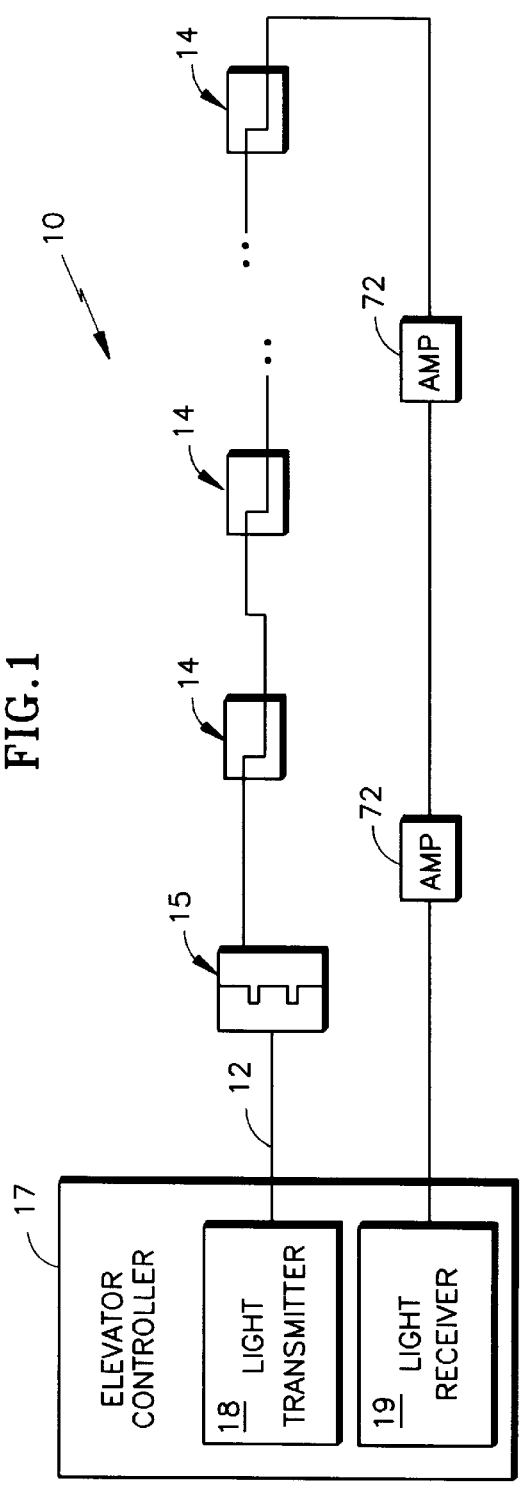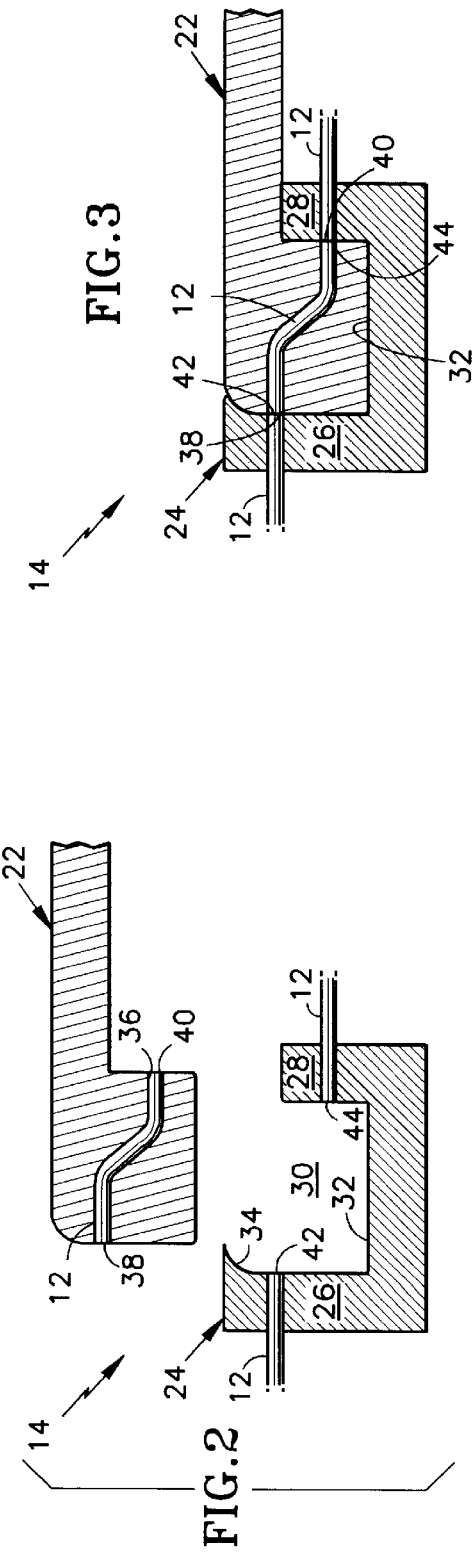

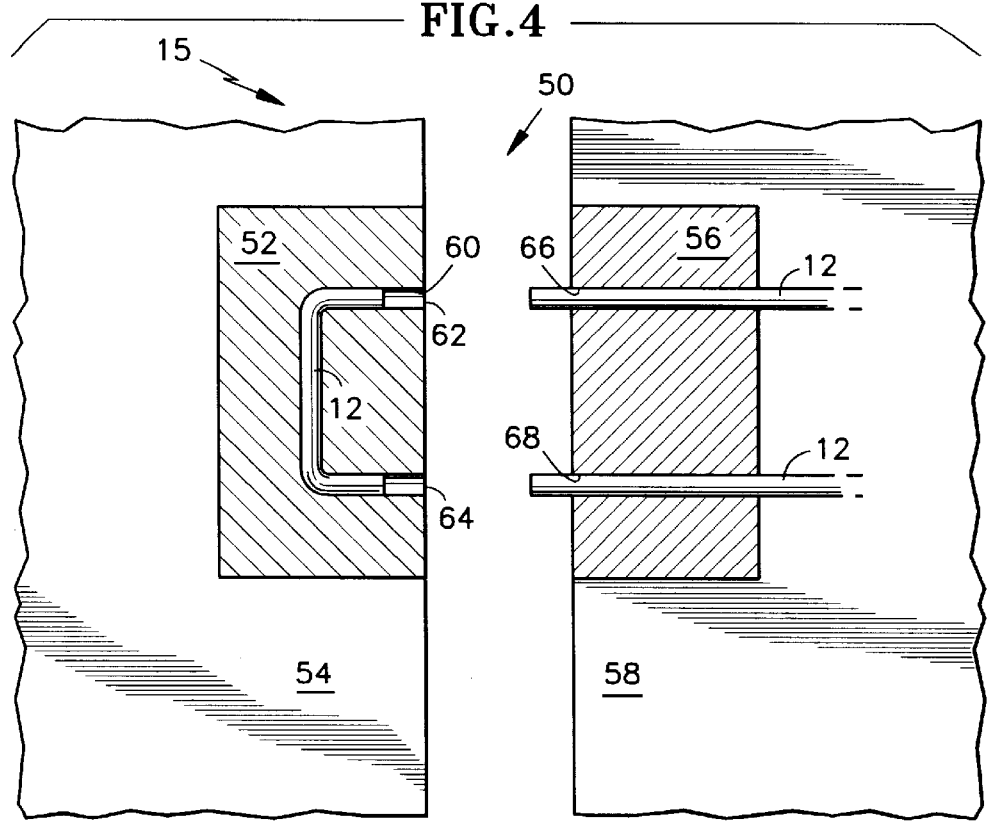
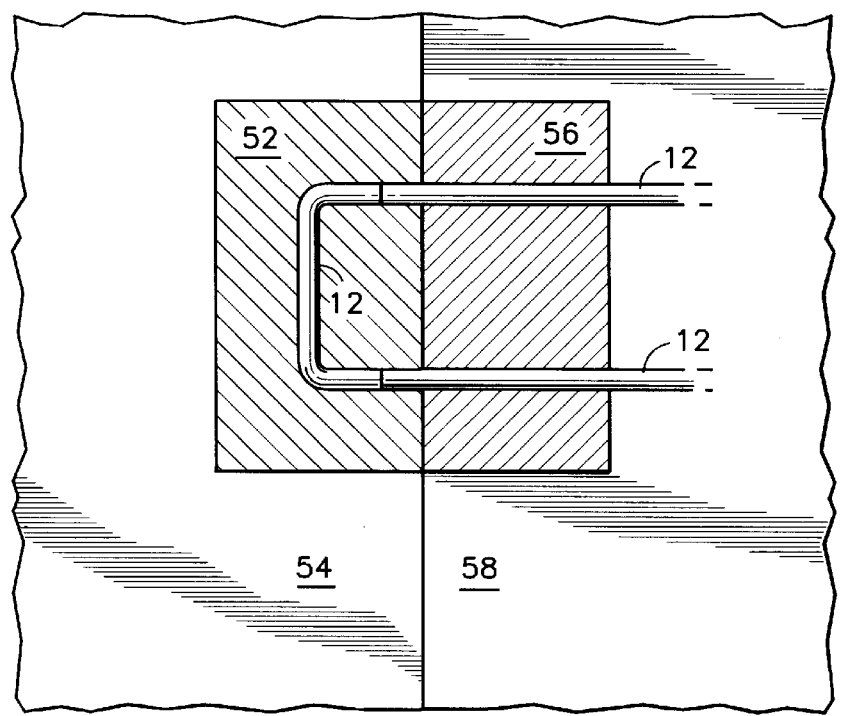

OPTICAL DOOR LOCK

TECHNICAL FIELD

This invention relates to an elevator door lock system and, more particularly, to an elevator door lock system utilizing optical medium for detecting mechanical locking of an elevator door.

BACKGROUND OF THE INVENTION

Elevator systems comprise various features to ensure the safe and efficient operation of the system. One such feature is the use of a safety chain which requires that several conditions, necessary for safe operation of an elevator car, are met. The safety chain includes electrical contact switches for elevator safety devices and for closure of elevator and hoistway doors. The electrical contact switches provide verification to an elevator controller, located in the machine room, that the necessary mechanical conditions of the elevator doors are met.

Most modern elevator door systems have safety chains, which are essentially circuits, comprising a relay contact switch that detects closure of all car and hoistway doors, a car door contact switch that monitors the car door, and hoistway door contact switches that monitor the hoistway doors. The safety chain is interfaced with the elevator controller which processes the information received from the safety chain to determine whether it is safe to move the elevator car. Because safety codes require an electromechanical lock, the car door and hoistway door contact switches are integrated into the mechanical door locks.

In the conventional hoistway door and car door locks, the lock typically comprises a door contact switch including a spring loaded contact and a shorting bar. When the doors are mechanically locked, the shorting bar comes into contact with the spring loaded contact and a signal is sent to the elevator controller that the hoistway doors are locked.

When all the safety devices and hoistway door and car door contacts along the safety chain are closed, indicating that all the necessary safety conditions are met, the elevator controls are signaled that it is safe to move.

While these door lock systems are commonly used, they are subject to several potential problems. One such problem involves dirt and buildup of carbon on the electrical contacts causing a "false" signal. This "false" signal is produced by disallowing the shorting of the electrical contact which prevents a signal being sent to the elevator controller that the doors have been mechanically locked. Another potential problem is shorting of the spring loaded contact by an object other than the shorting bar, such as a coin or metal piece. This also causes a "false" signal and may prevent the door lock from mechanically locking. Furthermore, electrical losses at each lock, which are in series, do not allow the signal to be read reliably by the controller. All of these problems may cause conditions which are costly and time consuming to correct.

Therefore, there exists a need for a safety chain which provides a more reliable means of verifying mechanical locking.

DISCLOSURE OF THE INVENTION

It is an object of the present invention to provide more reliable door lock detection for elevator door systems.

According to the present invention, a safety chain utilizes optical fiber hich transmits a light beam to verify mechanical locking of a plurality of doors. The plurality of doors have self-guiding optomechanical locks which incorporate optical fiber to determine if each of the plurality of doors have been locked. The optical safety chain in combination with optomechanical door locks provides the necessary feedback to the elevator controller for safe operation of the elevator system.

One advantage of the present invention is that it reduces complexity in installation by utilizing a single optical fiber.

Another advantage of the present invention is that it allows for relaxed tolerances in positioning of the mechanical lock parts which will allow for more robust designs.

Yet another advantage of the present invention is that the number of callbacks are reduced and that less costly maintenance is provided for by eliminating the necessity of cleaning the electrical contacts.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 1 is a simplified circuit diagram of an optical safety chain of the present invention;

FIG. 2 is a cross-sectional view of the optomechanical hoistway door lock of the present invention of FIG. 1 in the disengaged position;

FIG. 3 is a cross-sectional view of the optomechanical hoistway door lock of FIG. 2 in the engaged position;

FIG. 4 is a cross-sectional view of the optomechanical elevator car door lock of the present invention of FIG. 1 in the disengaged position; and FIG. 5 is a cross-sectional view of the optomechanical elevator car door lock of FIG. 4 in the engaged position.

BEST MODE FOR CARRYING OUT THE INVENTION

Referring to FIG. 1, an optical safety chain 10 of the present invention utilizing optical fiber 12 comprises a plurality of hoistway door locks 14, a car door lock 15, and an elevator controller 17 having a light transmitter 18 and a light receiver 19. The elevator controller 17 is positioned in the machine room of the elevator system (not shown).

Referring to FIG. 2, each of a plurality of hoistway door locks 14 of the present invention using optical fiber 12 comprises a lock mechanism 22 and a hoistway lock housing 24. A mechanism passageway 36 is disposed within the lock mechanism 22. The mechanism passageway 36 has a first mechanism passageway end 38 oppositely located from a second mechanism passageway end 40. Optical fiber 12 is disposed in the mechanism passageway 36.

Hoistway lock housing 24 includes a first side 26 having a first housing passageway 42, a second side 28 having a second housing passageway 44, a recess 30 and an inner surface 32. The inner surface 32 has a curved top edge 34 to facilitate self-guidance of the lock mechanism 22 into the recess 30. Optical fiber 12 is disposed within the first housing passageway 42 and the second housing passageway 44.

The lock mechanism 22, when moving into the engaged position, will rotate downward into the inner recess 30 of hoistway lock housing 24. Referring to FIG. 3, when the lock mechanism 22 is fully rotated, the first mechanism passageway end 38 is in register with first housing passageway 42. Also, second mechanism passageway end 40 is in register with second housing passageway 44.

Referring to FIG. 4, the car door lock 15 comprises a car door lock housing 50 having a first portion 52 mounted on an elevator car door 54 and a second portion 56 mounted on an elevator car door 58 adjacent to elevator car door 54. First portion 52 includes a first car passageway 60 having a first passageway end 62 and a second passageway end 64. Second portion 56 includes a second car passageway 66 and a third car passageway 68 protruding therefrom.

The car door lock 15 also has optical fiber 12 disposed within the first car passageway 60, second car passageway 66, and third car passageway 68. Referring to FIG. 5, as the elevator doors 54, 58 are closed, the second car passageway 66 will align with the first passageway end 62 and the third car passageway 68 will align with the second passageway end 64.

In operation, the optical safety chain 10 includes the plurality of hoistway door locks 14 in series with a car door lock 15. A beam of light is originated at the light transmitter 18 located in the elevator controller 17. As the beam encounters each lock in the series of locks 14, 15, if the lock 14, 15 is mechanically disengaged, the light beam is broken and does not reach the light receiver 19 located in the elevator controller 17 as best seen in FIG. 1. If the lock is a car door lock 15 and the car door lock 15 is mechanically engaged, the beam of light is transmitted through the car door lock housing 50. If the lock is a hoistway door lock 14 and the hoistway door lock 14 is mechanically engaged, the beam of light is transmitted from one of the first or second sides 26, 28 of the hoistway lock housing 24, through the lock mechanism 22, to the other of the first or second sides 26, 28 of hoistway lock housing 24. Once each lock 14, 15 is mechanically engaged, thus the beam is continuously transmitted through the safety chain 10, the light will reach the light receiver 19. The elevator controller 17 will be signaled by the light receiver 19 that all the locks 14, 15 are engaged and the elevator controller 17 may use this information in management of the optical safety chain 10.

Referring to FIG. 1, a plurality of amplifiers 72 may be used in order to correct any loss of light at junctions (not shown) in the safety chain 10. The plurality of amplifiers 72 will ensure that the light receiver 19 will receive the signal that all the locks 14, 15 in the optical safety chain 10 are engaged.

The best mode embodiment of the present invention uses a single mode optical fiber for the transmission of light throughout the safety chain. For the plurality of hoistway door locks 14, the best mode embodiment uses a non-linear mechanism passageway 36 to minimize the amount of incident light in the safety chain 10. The first car passageway 60 of the car door lock 15 also has a non-linear shape to minimize the amount of incident light in the safety chain 10.

The present invention of an optical safety chain using a plurality of optomechanical locks in combination with a controller having a transmitter and receiver, provides a system which can be adopted to provide more reliable detection of mechanical locking. One of the unique features of the present invention is that it reduces maintenance costs by eliminating cleaning of electrical contacts and eliminating call backs due to "false" locking.

Although the best mode embodiment of the present invention uses a single mode fiber, a multi mode fiber may be used in the present invention to differentiate, for example, hoistway door locks from the car door lock. Also the best mode embodiment uses a non-linear passageway in the lock mechanism of the hoistway door lock and in the lock housing of the car door lock. However, linear passageways may be used in the present invention.

While the present invention has been illustrated and described with respect to a particular embodiment thereof, it should be appreciated by those of ordinary skill in the art, that various modifications to this invention may be made without departing from the spirit and scope of the present invention. For example, the best mode embodiment involves the use of the optical system within an elevator door system, the present invention may also be used with other systems that need verification of mechanical engagements.

I claim:

1. A door lock having an engaged position and a disengaged position, said door lock comprising:

a lock mechanism having a locked position and an unlocked position corresponding to said engaged position and said disengaged position of said door lock, respectively, said lock mechanism having a first passageway;

a lock housing having a first housing side having a second passageway, and a second housing side having a third passageway, and means for guidance of said lock mechanism; and an optical medium for verifying mechanical locking of said door lock, said optical medium being disposed within said first, second, and third passageways, said first, second, and third passageways being in register when said door lock is in said engaged position.

2. The door lock according to claim 1, wherein said means for guidance comprises a curved inner surface.

* * * * *